(12) United States Patent
Hakola et al.

(10) Patent No.: US 11,140,683 B2
(45) Date of Patent: Oct. 5, 2021

(54) METHODS AND APPARATUSES FOR PERIODIC UPLINK SIGNALS WITH HYBRID TRANSCEIVER ARCHITECTURES

(71) Applicant: Nokia Technologies Oy, Espoo (FI)

(72) Inventors: Sami-Jukka Hakola, Kempele (FI); Esa Tapani Tiirola, Kempele (FI)

(73) Assignee: Nokia Technologies Oy, Espoo (FI)

(*) Notice: Subject to any disclaimer, the term of this patent is extended or adjusted under 35 U.S.C. 154(b) by 577 days.

(21) Appl. No.: 16/080,430

(22) PCT Filed: Mar. 1, 2016

(86) PCT No.: PCT/US2016/020221
§ 371 (c)(1),
(2) Date: Aug. 28, 2018

(87) PCT Pub. No.: WO2017/151116
PCT Pub. Date: Sep. 8, 2017

(65) Prior Publication Data
US 2021/0204265 A1 Jul. 1, 2021

(51) Int. Cl.
*H04W 72/04* (2009.01)
*H04W 36/00* (2009.01)
*H04B 7/06* (2006.01)
*H04W 72/08* (2009.01)

(52) U.S. Cl.
CPC ........ *H04W 72/046* (2013.01); *H04B 7/0695* (2013.01); *H04W 36/0055* (2013.01); *H04W 72/085* (2013.01)

(58) Field of Classification Search
CPC ............ H04W 72/046; H04W 72/085; H04W 36/0055; H04B 7/0695
See application file for complete search history.

(56) References Cited

U.S. PATENT DOCUMENTS

| | | |
|---|---|---|
| 2011/0170516 A1 | 7/2011 | Hu et al. |
| 2013/0121271 A1 | 5/2013 | Chen et al. |
| 2013/0182683 A1 | 7/2013 | Seol et al. |
| 2013/0201938 A1 | 8/2013 | Seol et al. |
| 2014/0036880 A1 | 2/2014 | Dalsgaard |
| 2014/0213315 A1 | 7/2014 | Kim et al. |
| 2015/0009951 A1 | 1/2015 | Josiam et al. |

(Continued)

FOREIGN PATENT DOCUMENTS

CN 104471886 A 3/2015

OTHER PUBLICATIONS

Guo, Roger, et al. "On beam-based access technology for 5G." IEEE Wireless Communications 23.5 (2016): 2-3 (Year: 2016).*

(Continued)

*Primary Examiner* — Sharad Rampuria
(74) *Attorney, Agent, or Firm* — Harrington & Smith

(57) ABSTRACT

Systems, methods, apparatuses, and computer program products for periodic uplink (UL) signals with hybrid transceiver architectures are provided. One method includes configuring, by a network node, opportunities for periodic signal transmission for user equipment based around cell-specific sweeping uplink resources. In an embodiment, the sweeping comprises a process for providing more than one opportunity for the user equipment to transmit a periodic signal based on the user equipment's location in the cell.

19 Claims, 5 Drawing Sheets

(56) References Cited

U.S. PATENT DOCUMENTS

2015/0296522 A1     10/2015   Bergstrom et al.
2015/0382268 A1     12/2015   Hampel et al.
2018/0359790 A1*   12/2018   Ingale .................. H04W 28/16

OTHER PUBLICATIONS

Giordani, Marco, et al. "An efficient uplink multi-connectivity scheme for 5G millimeter-wave control plane applications." IEEE Transactions on Wireless Communications 17.10 (2018): 6806-6821. (Year: 2018).*

Office action received for corresponding Indian Patent Application No. 201847036120, dated Jul. 15, 2020, 6 pages.

Office action received for corresponding Euroepan Patent Application No. 16892863.8 dated Jul. 24, 2020, 7 pages.

Extended European Search Report received for corresponding European Patent Application No. 16892863.8, dated Jul. 29, 2019, 8 pages.

"3rd Generation Partnership Project; Technical Specification Group Radio Access Network; Evolved Universal Terrestrial Radio Access (E-UTRA); Physical layer procedures (Release 13)", 3GPP TS 36.213, V13.0.1, Jan. 2016, pp. 1-326.

International Search Report and Written Opinion received for corresponding Patent Cooperation Treaty Application No. PCT/US2016/020221, dated May 2, 2016, 16 pages.

Tentative Rejection received for corresponding Taiwan Patent Application No. 106105881, dated May 7, 2018, 18 pages of Tentative Rejection and 4 pages of translation available.

* cited by examiner

METHODS AND APPARATUSES FOR PERIODIC UPLINK SIGNALS WITH HYBRID TRANSCEIVER ARCHITECTURES

RELATED APPLICATION

This application was originally filed as Patent Cooperation Treaty Application No. PCT/US 2016/020221 filed Mar. 1, 2016.

BACKGROUND

Field

Embodiments of the invention generally relate to wireless or mobile communications networks, such as, but not limited to, the Universal Mobile Telecommunications System (UMTS) Terrestrial Radio Access Network (UTRAN), Long Term Evolution (LTE) Evolved UTRAN (E-UTRAN), LTE-Advanced (LTE-A), LTE-Advanced Pro, LTE-M, and/or 5G radio access technology. In particular, some embodiments may relate to 5G physical layer.

Description of the Related Art

Universal Mobile Telecommunications System (UMTS) Terrestrial Radio Access Network (UTRAN) refers to a communications network including base stations or Node Bs, and, for example, radio network controllers (RNC). UTRAN allows for connectivity between the user equipment (UE) and the core network. The RNC provides control functionalities for one or more Node Bs. The RNC and its corresponding Node Bs are called the Radio Network Subsystem (RNS). In case of E-UTRAN (enhanced UTRAN), no RNC exists and radio access functionality is provided by an evolved Node B (eNodeB or eNB) or many eNBs. Multiple eNBs are involved for a single UE connection, for example, in case of Coordinated Multipoint Transmission (CoMP) and in dual connectivity.

Long Term Evolution (LTE) or E-UTRAN provides a new radio access technology and refers to the improvements of UMTS through improved efficiency and services, lower costs, and use of new spectrum opportunities. In particular, LTE is a 3GPP standard that provides for uplink peak rates of at least, for example, 75 megabits per second (Mbps) per carrier and downlink peak rates of at least, for example, 300 Mbps per carrier. LTE supports scalable carrier bandwidths from 20 MHz down to 1.4 MHz and supports both Frequency Division Duplexing (FDD) and Time Division Duplexing (TDD).

As mentioned above, LTE may also improve spectral efficiency in networks, allowing carriers to provide more data and voice services over a given bandwidth. Therefore, LTE is designed to fulfill the needs for high-speed data and media transport in addition to high-capacity voice support. Advantages of LTE include, for example, high throughput, low latency, FDD and TDD support in the same platform, an improved end-user experience, and a simple architecture resulting in low operating costs.

Certain releases of 3GPP LTE (e.g., LTE Rel-10, LTE Rel-11, LTE Rel-12, LTE Rel-13) are targeted towards international mobile telecommunications advanced (IMT-A) systems, referred to herein for convenience simply as LTE-Advanced (LTE-A).

LTE-A is directed toward extending and optimizing the 3GPP LTE radio access technologies. A goal of LTE-A is to provide significantly enhanced services by means of higher data rates and lower latency with reduced cost. LTE-A is a more optimized radio system fulfilling the international telecommunication union-radio (ITU-R) requirements for IMT-Advanced while keeping the backward compatibility.

$5^{th}$ generation wireless systems (5G) refers to the new generation of radio systems and network architecture. 5G is expected to provide higher bitrates and coverage than the current LTE systems. Some estimate that 5G will provide bitrates one hundred times higher than LTE offers. 5G is also expected to increase network expandability up to hundreds of thousands of connections. The signal technology of 5G is anticipated to be improved for greater coverage as well as spectral and signaling efficiency.

SUMMARY

One embodiment is directed to a method, which may include configuring, by a network node, opportunities for periodic signal transmission for a user equipment based around cell-specific sweeping uplink resources.

In an embodiment, the sweeping comprises a process for providing more than one opportunity for the user equipment to transmit a periodic signal based on the user equipment's location in the cell.

According to one embodiment, the periodic signal comprises at least one of a scheduling request (SR), sounding reference signal (SRS), and periodic channel state information (CSI). The resources may be arranged in the form of consecutive uplink sweeps with predefined at least one of periodicity and subframe offset.

In an embodiment, each of the uplink sweeps comprise multiple sweeping resources corresponding to different set of downlink and/or uplink beams, where a mapping relationship between at least one downlink beam, at least one uplink beam, and at least one sweeping resource has been established.

According to one embodiment, the periodic signal transmission comprises a predetermined resource index, periodicity, and subframe offset. In an embodiment, the sweeping uplink resources comprises at least one subset of predetermined sweeping uplink resources.

In an embodiment, a periodicity of signal transmission in the at least one subset of predetermined sweeping uplink resources is different from another periodicity of signal transmission in at least another subset of predetermined sweeping uplink resources, when the at least another subset of predetermined sweeping uplink resources is different from the at least one subset of predetermined sweeping uplink resources.

According to one embodiment, a periodicity of signal transmission in the at least one subset of predetermined sweeping uplink resources is same as periodicity of signal transmission in at least another subset of predetermined sweeping uplink resources, when the at least another subset of predetermined sweeping uplink resources is different from the at least one subset of predetermined sweeping uplink resources.

In an embodiment, the method may further include providing, by the network node, additional sweeping uplink resources defined for periodic control signals. According to certain embodiments, the configuring further comprises configuring the sweeping uplink resources in beam specific manner.

According to one embodiment, the method may also include multiplexing different signals within same sweeping uplink resources. In an embodiment, the method may include building a link control, beam switching and recovery procedure upon the cell-specific sweeping uplink resources.

Another embodiment is directed to an apparatus, which may include at least one processor and at least one memory including computer program code. The at least one memory and computer program code are configured, with the at least one processor, to cause the apparatus at least to configure opportunities for periodic signal transmission for a user equipment based around cell-specific sweeping uplink resources.

Another embodiment is directed to an apparatus that includes configuring means for configuring opportunities for periodic signal transmission for a user equipment based around cell-specific sweeping uplink resources.

In an embodiment, the sweeping comprises a process for providing more than one opportunity for the user equipment to transmit a periodic signal based on the user equipment's location in the cell.

According to an embodiment, the periodic signal comprises at least one of a scheduling request (SR), sounding reference signal (SRS), and periodic channel state information (CSI). The resources may be arranged in the form of consecutive uplink sweeps with predefined at least one of periodicity and subframe offset.

In one embodiment, each of the uplink sweeps comprise multiple sweeping resources corresponding to different set of downlink and/or uplink beams, where a mapping relationship between at least one downlink beam, at least one uplink beam, and at least one sweeping resource has been established.

According to an embodiment, the periodic signal transmission comprises a predetermined resource index, periodicity, and subframe offset. The sweeping uplink resources may include at least one subset of predetermined sweeping uplink resources.

In one embodiment, a periodicity of signal transmission in the at least one subset of predetermined sweeping uplink resources is different from another periodicity of signal transmission in at least another subset of predetermined sweeping uplink resources, when the at least another subset of predetermined sweeping uplink resources is different from the at least one subset of predetermined sweeping uplink resources.

According to an embodiment, a periodicity of signal transmission in the at least one subset of predetermined sweeping uplink resources is same as periodicity of signal transmission in at least another subset of predetermined sweeping uplink resources, when the at least another subset of predetermined sweeping uplink resources is different from the at least one subset of predetermined sweeping uplink resources.

In one embodiment, the apparatus may include providing means for providing additional sweeping uplink resources defined for periodic control signals. According to an embodiment, the configuring means further comprises means for configuring the sweeping uplink resources in beam specific manner.

In an embodiment, the apparatus may further include multiplexing means for multiplexing different signals within same sweeping uplink resources. According to one embodiment, the apparatus may also include building means for building a link control, beam switching and recovery procedure upon the cell-specific sweeping uplink resources.

Another embodiment is directed to a method, which may include receiving, by a user equipment, configuration of opportunities for periodic signal transmission based on cell-specific sweeping uplink resources. The method may then include determining, based on the received configuration, at least one sweeping resource to be used for uplink transmission.

In an embodiment, the resources are arranged in the form of consecutive uplink sweeps with predefined periodicity and subframe offset. According to one embodiment, each of the uplink sweeps comprise multiple sweeping resources corresponding to different set of downlink and/or uplink beams.

According to one embodiment, the periodic signal transmission comprises at least one of a predetermined resource index, periodicity, and subframe offset. In an embodiment, the user equipment is configured a periodic uplink signaling resource from the cell-specific uplink sweeping resources associated with multiple beams.

In an embodiment, when the user equipment determines that a current serving beam is no longer preferred or has quality that is lower than a predetermined quality threshold, the method may further include transmitting uplink signal on sweeping uplink resources associated with one or more preferred beams, and receiving a control message, from a network node, confirming a serving beam change.

According to an embodiment, the sweeping uplink resources comprises at least one subset of predetermined sweeping uplink resources. In one embodiment, a periodicity of signal transmission in the at least one subset of predetermined sweeping uplink resources is different from another periodicity of signal transmission in at least another subset of predetermined sweeping uplink resources, when the at least another subset of predetermined sweeping uplink resources is different from the at least one subset of predetermined sweeping uplink resources. In an embodiment, a periodicity of signal transmission in the at least one subset of predetermined sweeping uplink resources is same as periodicity of signal transmission in at least another subset of predetermined sweeping uplink resources, when the at least another subset of predetermined sweeping uplink resources is different from the at least one subset of predetermined sweeping uplink resources.

According to certain embodiments, the method may further include transmitting on at least one of the sweeping uplink resources, listening to downlink control channel for a potential beam switch command from a network node, determining from downlink sweep that a current beam does not have high enough quality, when a beam switch command is not detected on a downlink control channel, and declaring a radio link failure.

Another embodiment is directed to an apparatus that includes at least one processor and at least one memory including computer program code. The at least one memory and computer program code are configured, with the at least one processor, to cause the apparatus at least to receive configuration of opportunities for periodic signal transmission based on cell-specific sweeping uplink resources, and to determine, based on the received configuration, at least one sweeping resource to be used for uplink transmission.

Another embodiment is directed to an apparatus, which may include receiving means for receiving configuration of opportunities for periodic signal transmission based on cell-specific sweeping uplink resources, and determining means for determining, from the received configuration, at least one sweeping resource to be used for uplink transmission.

In an embodiment, the resources may be arranged in the form of consecutive uplink sweeps with predefined periodicity and subframe offset. According to certain embodiments, each of the uplink sweeps comprise multiple sweeping resources corresponding to different set of downlink and/or uplink beams.

According to one embodiment, the periodic signal transmission comprises at least one of a predetermined resource index, periodicity, and subframe offset. In an embodiment, the apparatus is configured a periodic uplink signaling resource from the cell-specific uplink sweeping resources associated with multiple beams.

In an embodiment, when the apparatus determines that a current serving beam is no longer preferred or has quality that is lower than a predetermined quality threshold, the apparatus further comprises transmitting means for transmitting uplink signal on sweeping uplink resources associated with one or more preferred beams, and receiving means for receiving a control message, from a network node, confirming a serving beam change.

According to one embodiment, the sweeping uplink resources comprises at least one subset of predetermined sweeping uplink resources. In an embodiment, a periodicity of signal transmission in the at least one subset of predetermined sweeping uplink resources is different from another periodicity of signal transmission in at least another subset of predetermined sweeping uplink resources, when the at least another subset of predetermined sweeping uplink resources is different from the at least one subset of predetermined sweeping uplink resources. In one embodiment, a periodicity of signal transmission in the at least one subset of predetermined sweeping uplink resources is same as periodicity of signal transmission in at least another subset of predetermined sweeping uplink resources, when the at least another subset of predetermined sweeping uplink resources is different from the at least one subset of predetermined sweeping uplink resources.

In certain embodiments, the apparatus may further include transmitting means for transmitting on at least one of the sweeping uplink resources, listening means for listening to downlink control channel for a potential beam switch command from a network node, determining from downlink sweep that a current beam does not have high enough quality, when a beam switch command is not detected on a downlink control channel, and declaring means for declaring a radio link failure.

BRIEF DESCRIPTION OF THE DRAWINGS

For proper understanding of the invention, reference should be made to the accompanying drawings, wherein.

DETAILED DESCRIPTION

Figure 1:
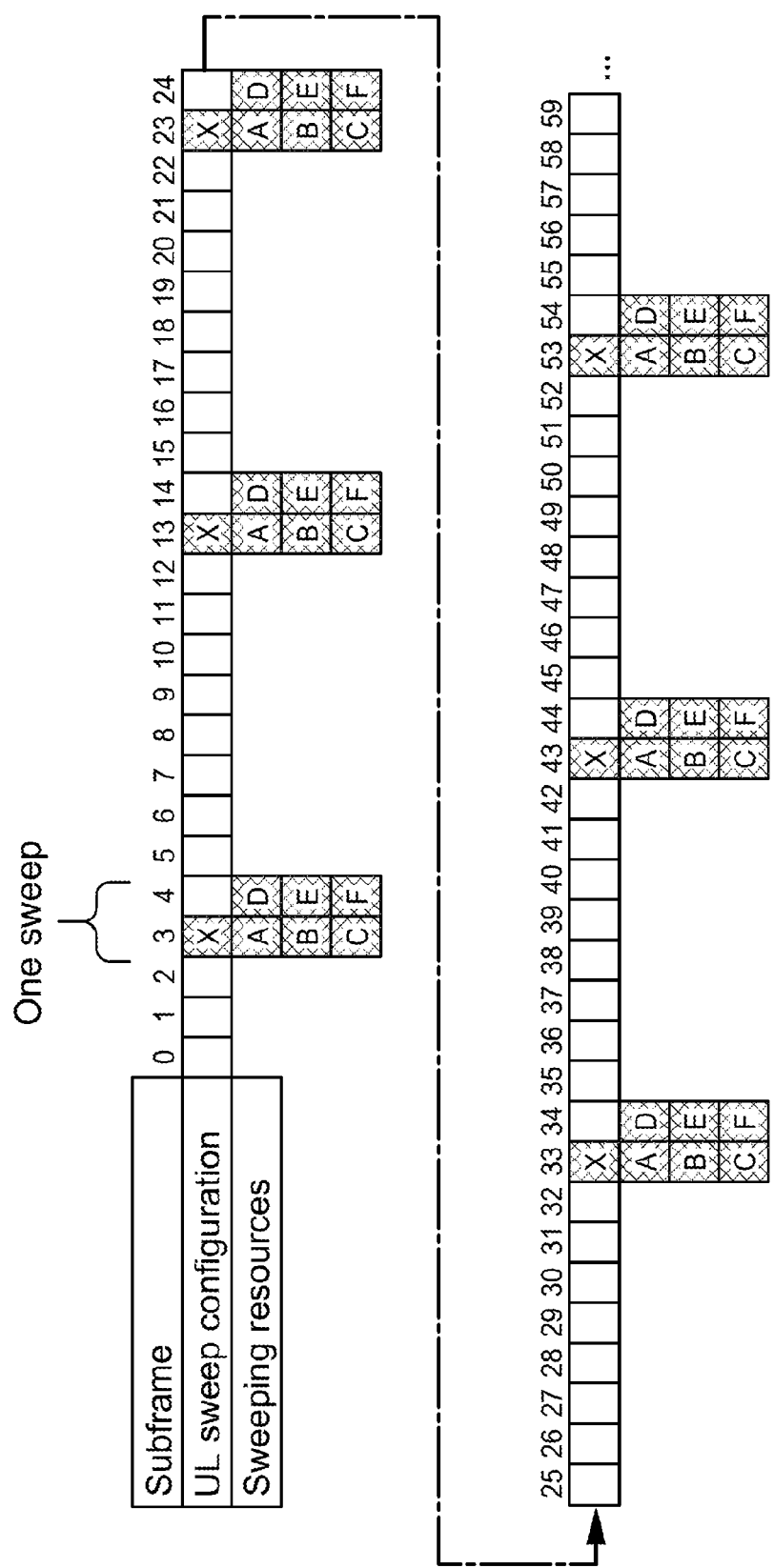
FIG. 1 illustrates an example UL sweep configuration, according to an embodiment.

It will be readily understood that the components of the invention, as generally described and illustrated in the figures herein, may be arranged and designed in a wide variety of different configurations. Thus, the following detailed description of embodiments of systems, methods, apparatuses, and computer program products for periodic uplink (UL) signals with hybrid transceiver architectures, as represented in the attached figures, is not intended to limit the scope of the invention, but is merely representative of some selected embodiments of the invention.

The features, structures, or characteristics of the invention described throughout this specification may be combined in any suitable manner in one or more embodiments. For example, the usage of the phrases "certain embodiments," "some embodiments," or other similar language, throughout this specification refers to the fact that a particular feature, structure, or characteristic described in connection with the embodiment may be included in at least one embodiment of the present invention. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more embodiments.

Additionally, if desired, the different functions discussed below may be performed in a different order and/or concurrently with each other. Furthermore, if desired, one or more of the described functions may be optional or may be combined. As such, the following description should be considered as merely illustrative of the principles, teachings and embodiments of this invention, and not in limitation thereof.

Embodiments of the invention relate to 5G physical layer. More specifically, certain embodiments are directed to physical layer design, for example, when a base station (BS) operates using a hybrid transceiver architecture.

A typical operation mode when using hybrid transceiver architecture is a beam based operation where a BS operating in Time Division Duplexing (TDD) mode can either transmit to or receive from certain directions only at a time. The number of parallel beams is determined by the number of baseband antenna ports (logical entity that can be uniquely distinguished by the receiver) and the number of RF chains (transceiver units).

Design parameters for a specific BS implementation may include the following. For instance, a BS may have 8 antenna ports and antenna array comprising four dual polarized antenna panels. Two antenna ports may be connected to each panel. In typical operation, radio frequency (RF) beams generated by one panel (two polarization beams) would be directed to the same direction (e.g., to provide spatial diversity and/or SU-MIMO with two spatial layers), thereby providing means to transmit to four different directions at a time. The same configuration may apply for reception as well. That configuration would always provide at least a transmit and receive diversity degree of two, respectively.

Normally, user plane data transfer is uplink initiated. To support low latency a scheduling request (SR) signaling is defined at the physical layer for UE to request resources for uplink with low overhead. The SR signaling may use just an On-Off keying. With proper multiplexing design, high multiplexing capacity can be provided to support a high number of active UEs when BS operates with digital transceiver architecture, i.e., it can receive from all direction at once. However, with hybrid transceiver architecture, multiplexing capacity is determined primarily by the number of parallel beams and beam width of the beams. To obtain high antenna gain, beams may be very narrow and thus only a limited number of UEs may be served by one beam at a time and, in some cases, only one UE may be served. Thus, providing SR resource for a high number of UEs distributed within the angular domain of the sector time domain multiplexing (within each beam) was the only solution. Allocating resources in time domain for SR to support high number of UEs would significantly increase system overhead since RF-/analog beamforming is non-frequency selective and thus limits possibilities for frequency domain multiplexing between uplink physical data channels and SR signals in the same symbols.

Uplink Sounding Reference Signal (SRS) may be used to channel quality determination to enable frequency selective scheduling and link adaptation on the uplink, as well as on downlink (DL) when DL-UL reciprocity can be assumed (i.e., TDD). In DL side, SRS may also facilitate DL MIMO. It may be used to also support timing advance measurements in addition to physical random access channel (PRACH) and other UL signals. UE implementations, such as at 30 GHz, are typically also hybrid architectures where achieving feasible effective isotopic radiated power (EIRP) levels for uplink transmission require transmitting using a narrow RF beam. Operating with narrow RF beam (i.e., non-omni transmission) requires searching of the proper beam. That training is preferably based on downlink signals and reciprocity assumption both at the BS and UE. Another possibility is to provide training via SRS transmission: UE is configured multiple SRS resources and one end (BS or UE) keeps the same RF beam and the other end switches from one beam to the other (BS or UE).

Massive multiple-input multiple-output (MIMO) based on RF beamforming is one of the key enablers in facilitating cost efficient Gb/s—communications at higher frequency bands, such as centimetre wave (cmWave), millimetre wave (mmWave). Embodiments of the present invention provide an arrangement for periodic signals on top of RF beamforming architecture. Periodic signals such as SR/SRS are important in the sense that they contribute to many 5G key performance indicators (KPIs), such as latency and spectrum efficiency (through system overhead).

Certain embodiments of the invention address and solve some significant technical problems. These include the inherent limitation of RF beamforming where, in practice, narrow RF beam can serve just one direction at a time. For that reason, fast control plane for UL signals, such as SR, SRS, Periodic channel state information (CSI) reporting, may be quite expensive in terms of system overhead. For example, each UE may typically require dedicated beam resources, but the number of Rx beams is limited by the implementation complexity (e.g., only four UEs/Rx beams can be supported). Hence, the number of control symbols needed increases linearly with the number of UEs. System overhead due to fast control plane increases with the number of UEs in the cell and the latency requirement involved in each control signal (such as SR/PRACH).

On the other hand, certain channels, such as SR, may involve uncertainty with respect to best beam. Periodic signals are configured typically via higher-layer signalling (e.g., to minimize overhead due to scheduling). Due to a UE's mobility, the best beam Tx/Rx beam from the eNB side (for certain UE) changes as a function of time. Hence, the eNB may not have up-to date information available about the best Rx beam, and the eNB may not have the best beam allocated when the UE is transmitting periodic signal. In some cases, the eNB may not hear the periodic signal at all. Performance is degraded accordingly (for example, missed detection probability of SR detection may increase considerably).

Thus, embodiments of the invention are able to address and solve at least the problems and issues noted above.

Current systems are based on digital transceiver architectures. As a result, support for periodic signals is not limited by multiplexing capacity of different signals. For example, LTE supports up-to 36 SR/slot/PRB (e.g., up-to 3600 SR/slot/20 MHz). Periodic resources in LTE use predetermined timing configured using two parameters: periodicity and offset. For example, scheduling request transmission is configured in 3GPP TS 36.213. Extension of the current solution does not work optimally in the RF beamforming system. As discussed, that kind of approach would result in the scenario where the eNB does not have the best beam allocated when the UE is transmitting periodic signals.

Certain embodiments of the invention are configured to arrange transmission and/or reception of periodic signals around cell specific sweeping UL resources. For example, in one embodiment, resources may be arranged in the form of consecutive UL sweeps with predefined periodicity and subframe offset. FIG. 1 illustrates an example configuration with periodicity of 10 subframes and offset of 3 subframes, according to an embodiment. Each UL sweep may be comprised of multiple sweeping resources corresponding to different set of DL and/or UL beams. The example of FIG. 1 depicts 6 beams, but other configurations are possible. In the example of FIG. 1, the multiple sweeping resources are denoted with letters A, B, C, D, E, F. According to some embodiments, each resource may contain a predetermined transmission symbol(s) within related subframes.

It is noted that, in principle, there may be one-to-one mapping between different set of DL and UL beams. However, in a situation where there are additional UL sweeping resources for periodic control signal, there is a smaller periodicity for DL beams (where UE performs the beam measurement) compared to that of beam-specific sweeping UL resources. Thus, when considering DL/UL beams in time axis there is no longer such a direct mapping between different set of DL and UL beams. Furthermore, it may be possible to use different beam patterns for DL and UL, for example, in such that UL beams have wider beam width. In this scenario, there can be many-to-one mapping between DL and UL beams.

According to one embodiment, an eNB may configure periodic signal transmission for a UE with limitations given by the (cell specific) UL sweeping configuration. Periodic signal transmission may have a predetermined resource index, periodicity, and subframe offset. It is noted that, as used herein, "sweeping" refers to a method for providing more than one opportunity for an UE to transmit certain periodic signal, based on UE's location in the cell.

In an embodiment, a UE may determine the actual sweeping resource, for example, one or more of resources A, B, . . . , F to be used separately for each transmission, for example based on DL measurement and/or explicit signaling from the eNB, where a resource may comprise at least one of the eNB beam index, UE beam index, time resource, frequency resource, space resource, code resource, periodicity and subframe offset. The determining of the actual sweeping resource may be based on a configured association between eNB beams and sweeping resources to enable the UE to transmit periodic signal transmission on a resource corresponding, for example, to a strong eNB beam determined by the UE via DL beam specific measurement. Transmission configuration may associate UE to transmit periodic signal to multiple eNB beams (candidate beams) to enable periodic validation and determination of the serving beam(s) for the UE.

In one embodiment, sweeping UL resources defined for common control plane (i.e., PRACH) form a subset of predetermined sweeping UL resources. In other words, the eNB may provide additional sweeping UL resources (compared to PRACH), which are defined for periodic control signals (but not for PRACH). This provides additional scalability for the system where UL opportunities can be provided without increasing DL overhead.

Figure 2:
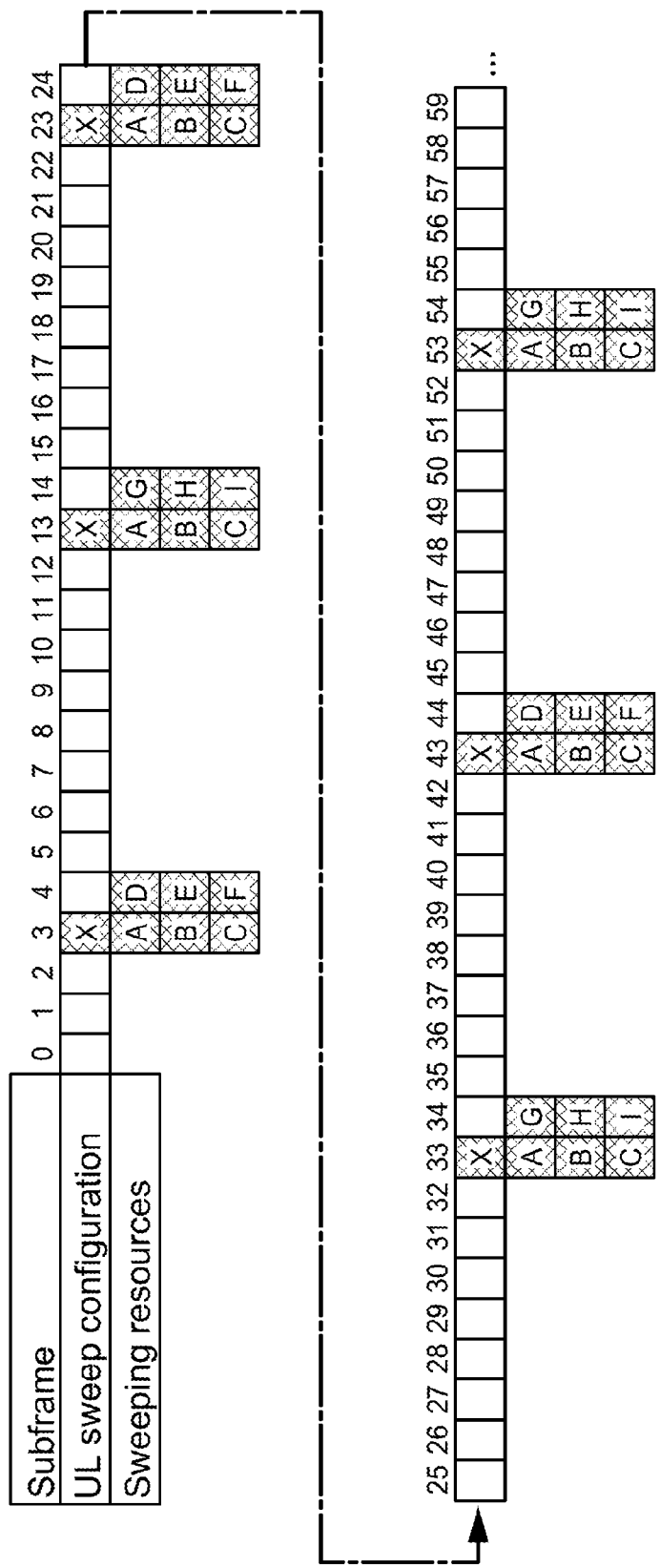
FIG. 2 illustrates another example UL sweep configuration, according to an embodiment.

In another embodiment, sweeping UL resources (such as periodicity) can be configured in beam specific manner such that predetermined directions can have more opportunities. This provides spatial selectivity for the periodic control signals (this is also difficult to arrange in common control plane). FIG. 2 illustrates another example configuration, according to an embodiment. In the example of FIG. 2, beams or uplink control signal resources A, B, C have 5 ms periodicity, whereas beams or uplink control signal resources D, E, F, G, H, I have 10 ms periodicity.

In an embodiment, different signals such as PRACH, SR, and SRS can be multiplexed within the same sweeping resources. For example, the different signals may use a similar waveform. In another example, the different signals may apply parallel/consecutive orthogonal subchannels.

In one embodiment, a link control and beam switching and recovery procedure may be built upon the above-described cell specific sweeping uplink resources. According to this embodiment, a UE may be configured a periodic uplink signaling resource from (cell specific) UL sweeping associated to multiple BS beams (or may also comprise all the beams in case of relatively high velocity).

According to one option, only if a UE notices that current serving BS beam (selected earlier as preferred beam) is no longer preferred or is having quality lower than a certain configured quality threshold, the UE transmits uplink signal during the sweep on the resources associated to preferred BS beam(s), i.e., via other than previous BS serving beam. Upon reception uplink signal on resource configured for the UE but not associated to the current serving beam, the eNB notices the beam switch. The eNB may acknowledge the serving beam switch by transmitting, to the UE, a control message to confirm the serving beam change. The UE may automatically try to listen to potential BS control message transmission after the uplink sweep for the certain amount of time using the current UE side beam. If the confirmation from the beam switch is not detected by the UE, it may declare a link failure and make a new access to the cell via random access channel. In one further option, there may be a configurable parameter that defines the number of how many attempts the UE would perform periodic UL control transmissions before declaring a radio failure if not receiving any feedback from eNB.

According to a second option, a UE transmits on all (or at least on more than one) configured uplink sweeping resources. Upon reception uplink signal on configured resources for the UE, the eNB determines whether or not the received signal via current serving beam is a preferred beam. If not, the eNB may switch the serving beam for the UE. In such a case, the eNB transmits a control message to the UE indicating the new serving beam(s). After uplink sweeping resources, the UE listens to downlink control channel for potential beam switch command from the eNB. If the UE does not detect a beam switch command and if the UE has determined from DL sweep that the current beam does not have high enough quality, the UE declares a radio link failure. Otherwise, the UE makes an assumption that current serving beam is good enough.

Figure 3:
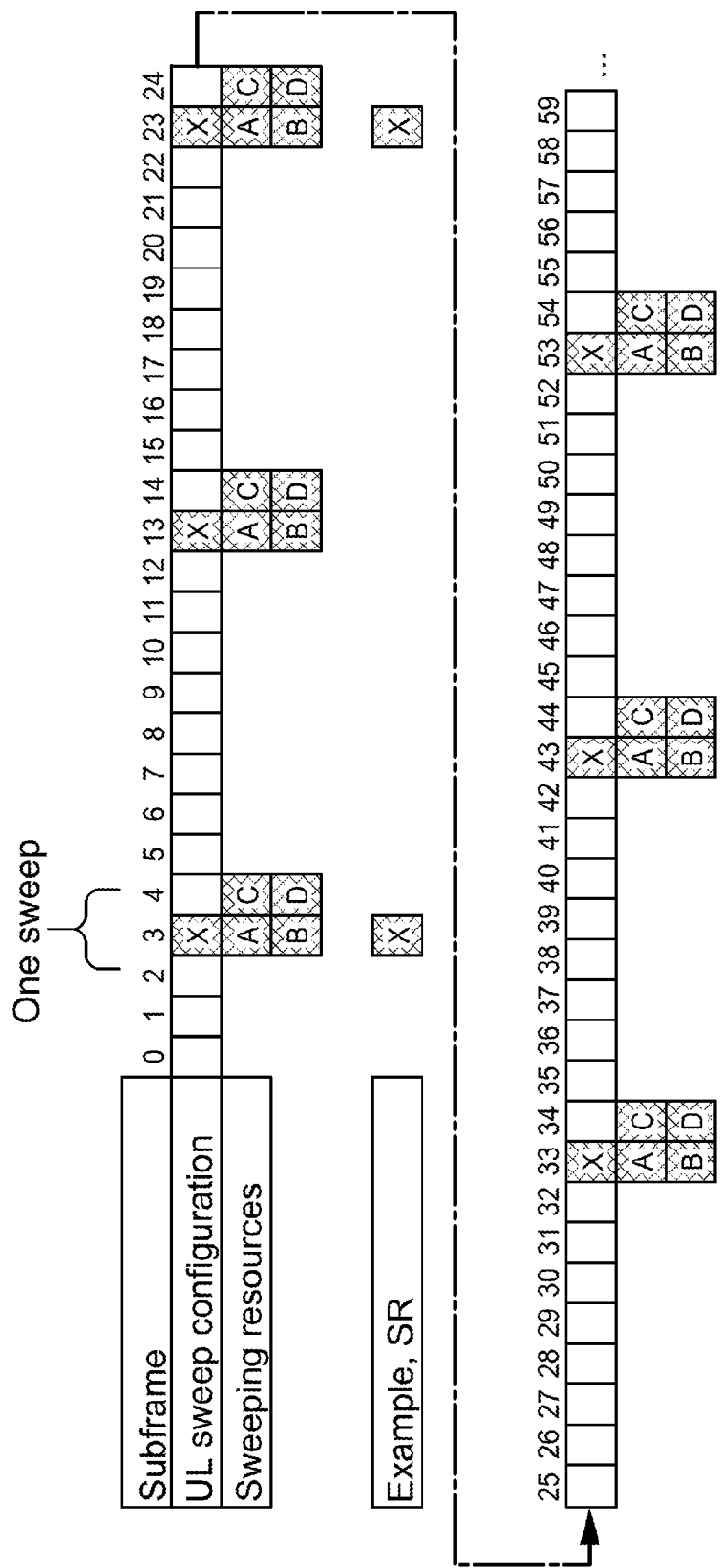
FIG. 3 illustrates another example UL sweep configuration, according to an embodiment.

FIG. 3 illustrates another example of a cell-specific UL sweep configuration. In the example of FIG. 3, the periodicity is 5 subframes and the subframe offset is 3 subframes. The eNB configures opportunities for periodic signal transmission with limitations given by cell specific UL sweeping configuration. In the example of FIG. 3, the UE is configured for SR transmission assuming a periodicity of 10 subframes, subframe offset of 3 subframes, and predefined resource(s) such as resource index j.

In this embodiment, each UL sweep may be made up of multiple resources corresponding to different set of DL/UL beams. In one example, there may be a one-to-one mapping relationship between DL and UL beams. The UE may determine the sweeping resource, for example resource A, B, C and/or D, based on DL measurement and/or explicit signaling from eNB. The UE may transmit periodic control signal, such as SR, according to configured UE-specific resources, which may include periodicity and/or subframe offset, based on a determined sweeping resource, for example resource A, B, C and/or D or via resource index j. The eNB may monitor periodic control signal via multiple sweeping resources, such as resources A, B, C and/or D.

In one configuration, narrowband resource blocks may be defined for SR and PRACH. Resource block bandwidth may be determined by the required timing estimation accuracy from PRACH signal. In one example embodiment, the minimum block size may be 72 subcarriers with 75 kHz subcarrier spacing. Multiplexing of SR and PRACH signals may be arranged in Frequency Domain Multiplexing (FDM) manner Multiplexing of SR and PRACH block with SRS may be arranged in Time Domain Multiplexing (TDM) manner. SRS requires a full bandwidth resource, but may be implemented using a frequency domain comb structure contrary to PRACH which requires typically a continuous allocation in frequency domain. Furthermore, assuming a Zadoff-Chu sequence multiplexing in code domain sequences of different length without stacked structure (i.e., sequence generated by stacking short sequence multiple times to get desired bandwidth). TDM multiplexing may be arranged by allocating SRS and PRACH/SR resources into different periodical UL sweep resources.

In another configuration, PRACH, SR and SRS are designed to be multiplexed within each in one symbol. For example, a stacked sequence may be created where a base sequence of length 72 is generated. PRACH and SR may use the base sequence length and allocation within a frequency domain that is configured. SRS sequence may be generated by stacking 72 long sequence by, for example, 16 times to get a 1152 long sequence (full carrier bandwidth assumed to be 1200 subcarriers). Different sequences for PRACH, SR and SRS configured to multiple UEs may be generated by cyclic shifts applied on one or more root sequences used to generate the base sequence.

Another option is to create a long sequence for all the signals and correspondingly a full bandwidth signal for PRACH, SR and SRS. For example, a Zadoff-Chu sequence of length 1193 and cyclically extended up to 1200 subcarriers.

Figure 4A:
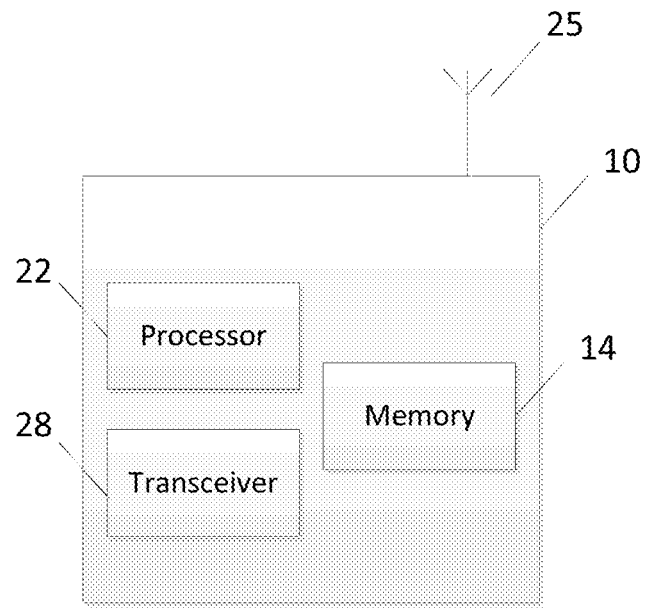
FIG. 4a illustrates an example block diagram of an apparatus, according to one embodiment.

FIG. 4a illustrates an example of an apparatus 10 according to an embodiment. In an embodiment, apparatus 10 may be a node, host, or server in a communications network or serving such a network. For example, in certain embodiments, apparatus 10 may be a network access node or network entity for a radio access network, such as LTE or LTE-A. Thus, in certain embodiments, apparatus 10 may be a base station or eNB. However, in other embodiments, apparatus 10 may be other components within a radio access network. It should be noted that one of ordinary skill in the art would understand that apparatus 10 may include components or features not shown in FIG. 4*a*.

As illustrated in FIG. 4*a*, apparatus 10 includes a processor 22 for processing information and executing instructions or operations. Processor 22 may be any type of general or specific purpose processor. While a single processor 22 is shown in FIG. 4*a*, multiple processors may be utilized according to other embodiments. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 10 may further include or be coupled to a memory 14 (internal or external), which may be coupled to processor 22, for storing information and instructions that may be executed by processor 22. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 14 can be comprised of any combination of random access memory (RAM), read only memory (ROM), static storage such as a magnetic or optical disk, or any other type of non-transitory machine or computer readable media. The instructions stored in memory 14 may include program instructions or computer program code that, when executed by processor 22, enable the apparatus 10 to perform tasks as described herein.

In some embodiments, apparatus 10 may also include or be coupled to one or more antennas 25 for transmitting and receiving signals and/or data to and from apparatus 10. Apparatus 10 may further include or be coupled to a transceiver 28 configured to transmit and receive information. For instance, transceiver 28 may be configured to modulate information on to a carrier waveform for transmission by the antenna(s) 25 and demodulate information received via the antenna(s) 25 for further processing by other elements of apparatus 10. In other embodiments, transceiver 28 may be capable of transmitting and receiving signals or data directly.

Processor 22 may perform functions associated with the operation of apparatus 10 which may include, for example, precoding of antenna gain/phase parameters, encoding and decoding of individual bits forming a communication message, formatting of information, and overall control of the apparatus 10, including processes related to management of communication resources.

In an embodiment, memory 14 may store software modules that provide functionality when executed by processor 22. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

In one embodiment, apparatus 10 may be a network node or network entity, such as a base station or eNB, for example. According to certain embodiments, apparatus 10 may be controlled by memory 14 and processor 22 to configure opportunities for periodic signal transmission for a UE based around cell-specific sweeping UL resources. In an embodiment, the sweeping UL resources may be arranged in the form of consecutive UL sweeps with predefined periodicity and subframe offset. For example, according to one example embodiment, the periodicity may be 10 subframes and the offset may be 3 subframes. In certain embodiments, each of the UL sweeps may comprise multiple sweeping resources corresponding to different set of DL/UL beams.

In an embodiment, each resource may contain a predetermined transmission symbol(s) within related subframes. According to certain embodiments, the periodic signal transmission may have a predetermined resource index, periodicity, and subframe offset.

In one embodiment, apparatus 10 may be controlled by memory 14 and processor 22 to define the sweeping UL resources for common control plane (i.e., PRACH) to form a subset of predetermined sweeping UL resources. In other words, apparatus 10 may provide additional sweeping UL resources (compared to PRACH), which are defined solely for periodic control signals (but not for PRACH). This provides additional scalability for the system (UL opportunities can be provided without increasing DL overhead).

In another embodiment, apparatus 10 may be controlled by memory 14 and processor 22 to configure the sweeping UL resources (e.g., periodicity) in beam specific manner such that predetermined directions can have more opportunities. This provides spatial selectivity for the periodic control signals, which is difficult to arrange in common control plane.

According to an embodiment, apparatus 10 may be controlled by memory 14 and processor 22 to multiplex different signals, such as PRACH, SR and SRS, within the same sweeping resources. For example, the signals may use a similar waveform, or may apply parallel/consecutive orthogonal subchannels.

In one embodiment, apparatus 10 may be controlled by memory 14 and processor 22 to build a link control, beam switching and recovery procedure upon the above-described cell specific sweeping uplink resources. For example, the UE may be configured with a periodic uplink signaling resource from (cell-specific) UL sweeping associated to multiple BS beams (which may also comprise all the beams in case of relatively high velocity). According to an embodiment, if the UE notices that the current serving BS beam selected earlier as preferred beam is no longer preferred or is providing quality that is lower than a certain configured quality threshold, the UE transmits uplink signal during the sweep on the resources associated to preferred BS beam(s), i.e., via other than the previous BS serving beam. Upon reception uplink signal on a resource configured for the UE but not associated to the current serving beam, apparatus 10 notices the beam switch. Apparatus 10 may be controlled by memory 14 and processor 22 to acknowledge the serving beam switch by transmitting to the UE a control message to confirm the serving beam change.

In another embodiment, a UE may transmit on all (or at least on more than one) configured uplink sweeping resources. Upon reception uplink signal on configured resources for the UE, apparatus 10 may be controlled by memory 14 and processor 22 to determine whether or not the received signal via the current serving beam is a preferred beam. If not, apparatus 10 may be controlled by memory 14 and processor 22 to switch the serving beam for the UE. In such a case, apparatus 10 may transmit a control message to the UE indicating the new serving beam(s). After uplink sweeping resources, the UE listens to downlink control channel for potential beam switch command from apparatus 10. If the UE does not detect a beam switch command and if the UE has determined from DL sweep that the current beam does not have high enough quality, the UE declares a radio link failure. Otherwise, the UE makes an assumption that current serving beam is good enough.

Figure 4B:
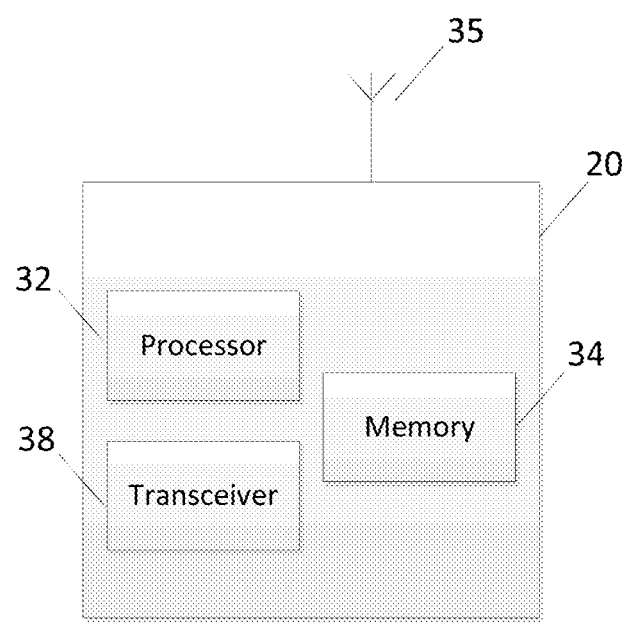
FIG. 4b illustrates an example block diagram of an apparatus, according to another embodiment.

FIG. 4b illustrates an example of an apparatus 20 according to another embodiment. In an embodiment, apparatus 20 may be a node or element in a communications network or associated with such a network, such as a mobile device, UE, machine type UE, NB-IoT UE, or other device. It should be noted that one of ordinary skill in the art would understand that apparatus 20 may include components or features not explicitly shown in FIG. 4b.

As illustrated in FIG. 4b, apparatus 20 includes a processor 32 for processing information and executing instructions or operations. Processor 32 may be any type of general or specific purpose processor. While a single processor 32 is shown in FIG. 4b, multiple processors may be utilized according to other embodiments. In fact, processor 32 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 20 may further include or be coupled to a memory 34 (internal or external), which may be coupled to processor 32, for storing information and instructions that may be executed by processor 32. Memory 34 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 34 can be comprised of any combination of random access memory (RAM), read only memory (ROM), static storage such as a magnetic or optical disk, or any other type of non-transitory machine or computer readable media. The instructions stored in memory 34 may include program instructions or computer program code that, when executed by processor 32, enable the apparatus 20 to perform tasks as described herein.

In some embodiments, apparatus 20 may also include or be coupled to one or more antennas 35 for transmitting and receiving signals and/or data to and from apparatus 20. Apparatus 20 may further include a transceiver 38 configured to transmit and receive information. For instance, transceiver 38 may be configured to modulate information on to a carrier waveform for transmission by the antenna(s) 35 and demodulate information received via the antenna(s) 35 for further processing by other elements of apparatus 20. In other embodiments, transceiver 38 may be capable of transmitting and receiving signals or data directly.

Processor 32 may perform functions associated with the operation of apparatus 20 including, without limitation, precoding of antenna gain/phase parameters, encoding and decoding of individual bits forming a communication message, formatting of information, and overall control of the apparatus 20, including processes related to management of communication resources.

In an embodiment, memory 34 stores software modules that provide functionality when executed by processor 32. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software.

As mentioned above, according to one embodiment, apparatus 20 may be a mobile device, such as a UE in LTE or LTE-A. According to an embodiment, apparatus 20 may be controlled by memory 34 and processor 32 to receive configuration of opportunities for periodic signal transmission based around cell-specific sweeping uplink resources, and to determine, from the configured opportunities for periodic signal transmission, at least one actual sweeping resource to be used separately for each user equipment transmission.

In an embodiment, the resources are arranged in the form of consecutive uplink sweeps with predefined periodicity and subframe offset. Each of the uplink sweeps may comprise multiple sweeping resources corresponding to different set of downlink/uplink beams. According to one embodiment, the periodic signal transmission comprises a predetermined resource index, periodicity, and subframe offset.

According to an embodiment, apparatus 20 may be configured a periodic uplink signaling resource from the cell-specific uplink sweeping associated with multiple beams. When the apparatus 20 determines that a current serving beam is no longer preferred or has quality that is lower than a predetermined quality threshold, apparatus 20 may be controlled by memory 34 and processor 32 to transmit uplink signal during the sweep on resources associated with one or more preferred beams, and to receive a control message, from a network node, confirming a serving beam change.

In another embodiment, apparatus 20 may be controlled by memory 34 and processor 32 to transmit on more than one of the configured sweeping uplink resources, to listen to downlink control channel for a potential beam switch command from a network node and, when a potential beam switch command is not detected and it is determined from downlink sweep that a current beam does not have high enough quality, to declare a radio link failure.

Figure 5A:
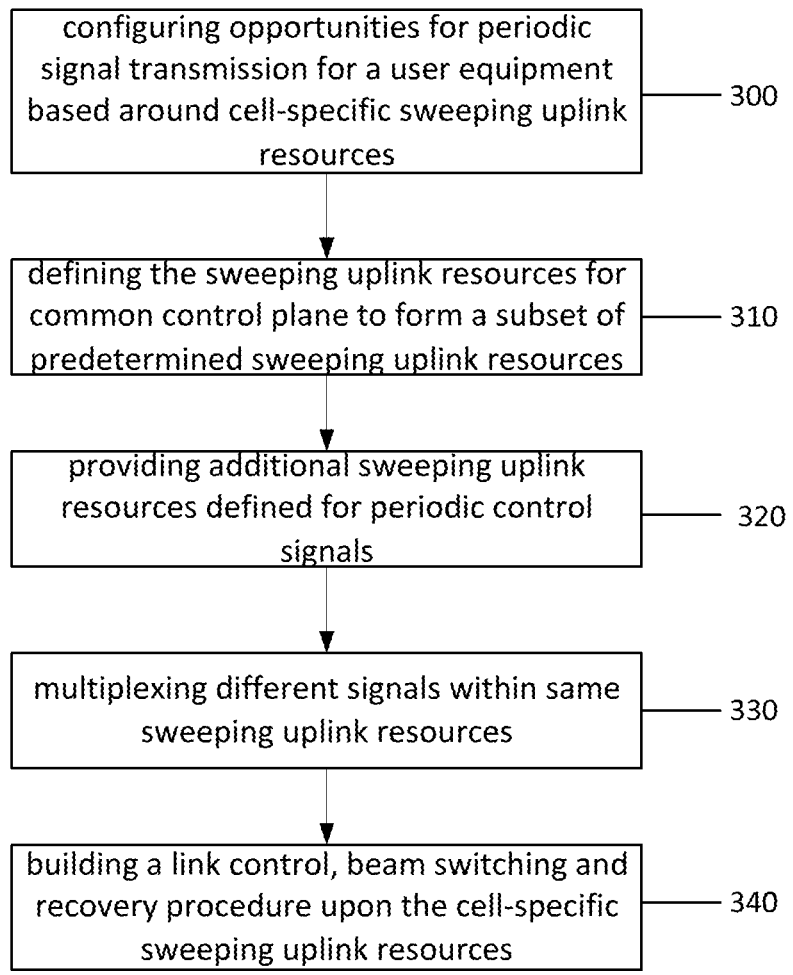
FIG. 5a illustrates a flow diagram of a method, according to one embodiment.

FIG. 5a illustrates an example flow diagram of a method, according to one embodiment. The method of FIG. 5a may be performed by a network node, such as an eNB. The method may include, at 300, configuring, by a network node, opportunities for periodic signal transmission for a user equipment based around cell-specific sweeping uplink resources. In an embodiment, the resources are arranged in the form of consecutive uplink sweeps with predefined periodicity and subframe offset. Each of the uplink sweeps may comprise multiple sweeping resources corresponding to different set of downlink/uplink beams.

In certain embodiments, the periodic signal transmission includes a predetermined resource index, periodicity, and subframe offset. According to an embodiment, the method may include, at 310, defining the sweeping uplink resources for common control plane to form a subset of predetermined sweeping uplink resources. In some embodiments, the method may also include, at 320, providing additional sweeping uplink resources defined for periodic control signals.

In an embodiment, the configuring of the opportunities for periodic signal transmission further includes configuring the sweeping uplink resources in beam specific manner such that predetermined directions have more opportunities. According to certain embodiments, the method may include, at 330, multiplexing different signals within same sweeping uplink resources. In some embodiments, the method may also include, at 340, building a link control, beam switching and recovery procedure upon the cell-specific sweeping uplink resources.

Figure 5B:
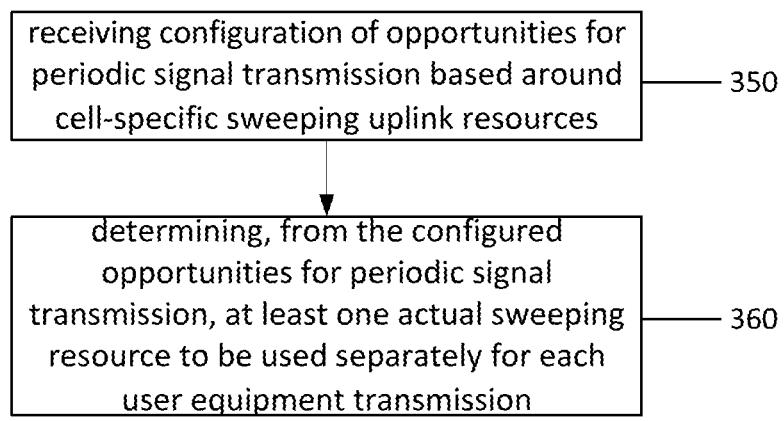
FIG. 5b illustrates a flow diagram of a method, according to one embodiment.

FIG. 5*b* illustrates an example flow diagram of a method, according to one embodiment. The method of FIG. 5*b* may be performed by a mobile node or device, such as a UE. The method may include, at 350, receiving configuration of opportunities for periodic signal transmission based around cell-specific sweeping uplink resources. The method may also include, at 360, determining, from the configured opportunities for periodic signal transmission, at least one actual sweeping resource to be used separately for each user equipment transmission.

In an embodiment, the resources are arranged in the form of consecutive uplink sweeps with predefined periodicity and subframe offset. Each of the uplink sweeps may include multiple sweeping resources corresponding to different set of downlink/uplink beams. The periodic signal transmission may include at least one of a predetermined resource index, periodicity, and subframe offset. According to one embodiment, the UE may be configured a periodic uplink signaling resource from the cell-specific uplink sweeping associated with multiple beams.

According to one embodiment, when the user equipment determines that a current serving beam is no longer preferred or has quality that is lower than a predetermined quality threshold, the method may further include transmitting uplink signal during the sweep on resources associated with one or more preferred beams, and receiving a control message, from a network node, confirming a serving beam change. In certain embodiments, the method may include transmitting on more than one of the configured sweeping uplink resources, listening to downlink control channel for a potential beam switch command from a network node, and, when a potential beam switch command is not detected and it is determined from downlink sweep that a current beam does not have high enough quality, declaring a radio link failure.

In view of the above, embodiments of the invention provide several advantages and technical improvements. These include efficient support for periodic uplink control signalling for hybrid architectures short of beam and hardware resources. In addition, multiplexing link control signalling, for example SRS discussed above, into uplink sweeping resources provides a low overhead link control and beam alignment control procedure.

In some embodiments, the functionality of any of the methods described herein may be implemented by software and/or computer program code or portions of it stored in memory or other computer readable or tangible media, and executed by a processor. In some embodiments, the apparatus may be, included or be associated with at least one software application, module, unit or entity configured as arithmetic operation(s), or as a program or portions of it (including an added or updated software routine), executed by at least one operation processor. Programs, also called program products or computer programs, including software routines, applets and macros, may be stored in any apparatus-readable data storage medium and they include program instructions to perform particular tasks. A computer program product may comprise one or more computer-executable components which, when the program is run, are configured to carry out embodiments. The one or more computer-executable components may be at least one software code or portions of it. Modifications and configurations required for implementing functionality of an embodiment may be performed as routine(s), which may be implemented as added or updated software routine(s). Software routine(s) may be downloaded into the apparatus.

Software or a computer program code or portions of it may be in a source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other embodiments, the functionality may be performed by hardware, for example through the use of an application specific integrated circuit (ASIC), a programmable gate array (PGA), a field programmable gate array (FPGA), or any other combination of hardware and software. In yet another embodiment, the functionality may be implemented as a signal, a non-tangible means that can be carried by an electromagnetic signal downloaded from the Internet or other network.

According to an embodiment, an apparatus, such as a node, device, or a corresponding component, may be configured as a computer or a microprocessor, such as single-chip computer element, or as a chipset, including at least a memory for providing storage capacity used for arithmetic operation and an operation processor for executing the arithmetic operation.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:
1. An apparatus, comprising:
   at least one processor; and
   at least one memory including computer program code,
      wherein the at least one memory and computer program code are configured, with the at least one processor, to cause the apparatus at least to
   receive, from a network node of a communication network, configuration of opportunities for periodic signal transmission based on sweeping uplink resources;
   determine, based on the received configuration, at least one sweeping resource to be used for uplink transmission;
   based on determining that a current serving beam of the network node is no longer preferred or has quality that is lower than a predetermined quality threshold, transmit an uplink signal on sweeping uplink resources associated with one or more preferred beams of the network node; and
   receive a control message, from the network node, confirming a serving beam change.

2. The apparatus according to claim 1, wherein the sweeping uplink resources are arranged in the form of consecutive uplink sweeps with predefined periodicity and subframe offset.

3. The apparatus according to claim 2, wherein each of the sweeping uplink resources comprise multiple sweeping resources corresponding to different set of downlink and/or uplink beams.

4. The apparatus according to claim 1, wherein the periodic signal transmission comprises at least one of a predetermined resource index, periodicity, and subframe offset.

5. The apparatus according to claim 1, wherein the apparatus is configured a periodic uplink signaling resource from the uplink sweeping resources associated with multiple beams.

6. The apparatus according to claim 1, wherein the sweeping uplink resources comprise at least one subset of predetermined sweeping uplink resources.

7. The apparatus according to claim 6, wherein a periodicity of signal transmission in the at least one subset of predetermined sweeping uplink resources is different from another periodicity of signal transmission in at least another subset of predetermined sweeping uplink resources, when the at least another subset of predetermined sweeping uplink resources is different from the at least one subset of predetermined sweeping uplink resources.

8. The apparatus according to claim 6, wherein a periodicity of signal transmission in the at least one subset of predetermined sweeping uplink resources is same as periodicity of signal transmission in at least another subset of predetermined sweeping uplink resources, when the at least another subset of predetermined sweeping uplink resources is different from the at least one subset of predetermined sweeping uplink resources.

9. The apparatus according to claim 1, wherein the at least one memory and computer program code are configured, with the at least one processor, to cause the apparatus at least to:
transmit on at least one of the sweeping uplink resources;
listen to downlink control channel for a potential beam switch command from a network node;
determine from downlink sweep that a current beam does not have high enough quality, when a beam switch command is not detected on a downlink control channel; and
declare a radio link failure.

10. An apparatus, comprising:
at least one processor; and
at least one memory including computer program code, wherein the at least one memory and computer program code are configured, with the at least one processor, to cause the apparatus at least to
configure opportunities for periodic signal transmission for a user equipment based on sweeping uplink resources,
receive an uplink signal from the user equipment on sweeping uplink resources associated with one or more preferred beams of the apparatus other than a current serving beam of the apparatus; and
provide a control message, from the apparatus to the user equipment, confirming a serving beam change.

11. The apparatus according to claim 10, wherein the sweeping comprises a process for providing more than one opportunity for the user equipment to transmit a periodic signal based on the user equipment's location in a cell.

12. The apparatus according to claim 10, wherein the periodic signal comprises at least one of a scheduling request (SR), sounding reference signal (SRS), and periodic channel state information (CSI).

13. The apparatus according to claim 10, wherein the sweeping uplink resources are arranged in the form of consecutive uplink sweeps with predefined at least one of periodicity and subframe offset.

14. The apparatus according to claim 10, wherein the periodic signal transmission comprises a predetermined resource index, periodicity, and subframe offset.

15. The apparatus according to claim 10, wherein the sweeping uplink resources comprise at least one subset of predetermined sweeping uplink resources.

16. The apparatus according to claim 15, wherein a periodicity of signal transmission in the at least one subset of predetermined sweeping uplink resources is different from another periodicity of signal transmission in at least another subset of predetermined sweeping uplink resources, when the at least another subset of predetermined sweeping uplink resources is different from the at least one subset of predetermined sweeping uplink resources.

17. The apparatus according to claim 15, wherein a periodicity of signal transmission in the at least one subset of predetermined sweeping uplink resources is same as periodicity of signal transmission in at least another subset of predetermined sweeping uplink resources, when the at least another subset of predetermined sweeping uplink resources is different from the at least one subset of predetermined sweeping uplink resources.

18. The apparatus according to claim 10, wherein the configuring further comprises configuring the sweeping uplink resources in beam specific manner.

19. A method, comprising:
receiving, by a user equipment from a network node, configuration of opportunities for periodic signal transmission based on cell-specific sweeping uplink resources; and
determining, based on the received configuration, at least one sweeping resource to be used for uplink transmission;
based on determining that a current serving beam of the network node is no longer preferred or has quality that is lower than a predetermined quality threshold, transmitting an uplink signal on sweeping uplink resources associated with one or more preferred beams of the network node; and
receiving a control message, from the network node, confirming a serving beam change.

\* \* \* \* \*